May 3, 1932.   A. A. SHARPLES   1,856,438
HAYMAKER
Filed Jan. 14, 1929   5 Sheets-Sheet 1

A. A. Sharples
Inventor

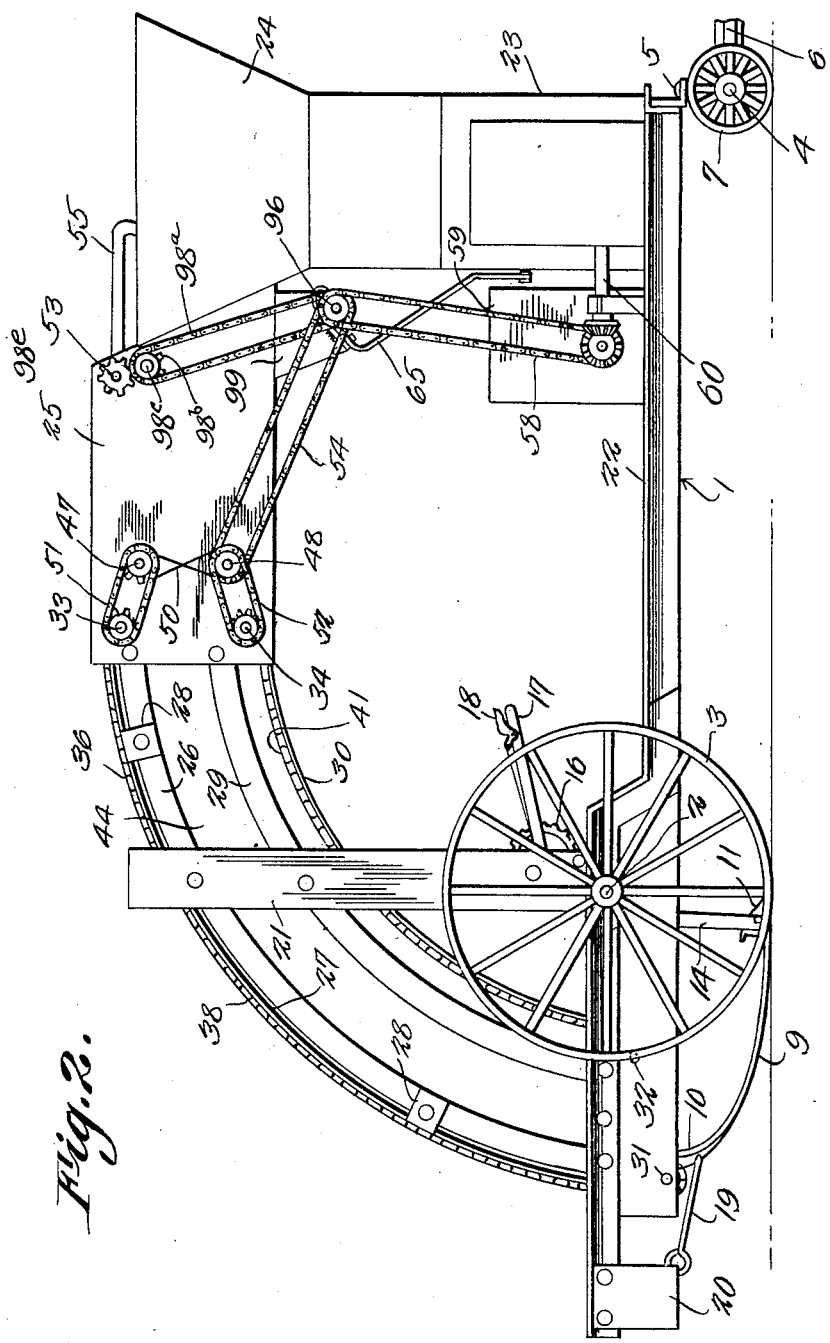

May 3, 1932.  A. A. SHARPLES  1,856,438
HAYMAKER
Filed Jan. 14, 1929   5 Sheets-Sheet 3
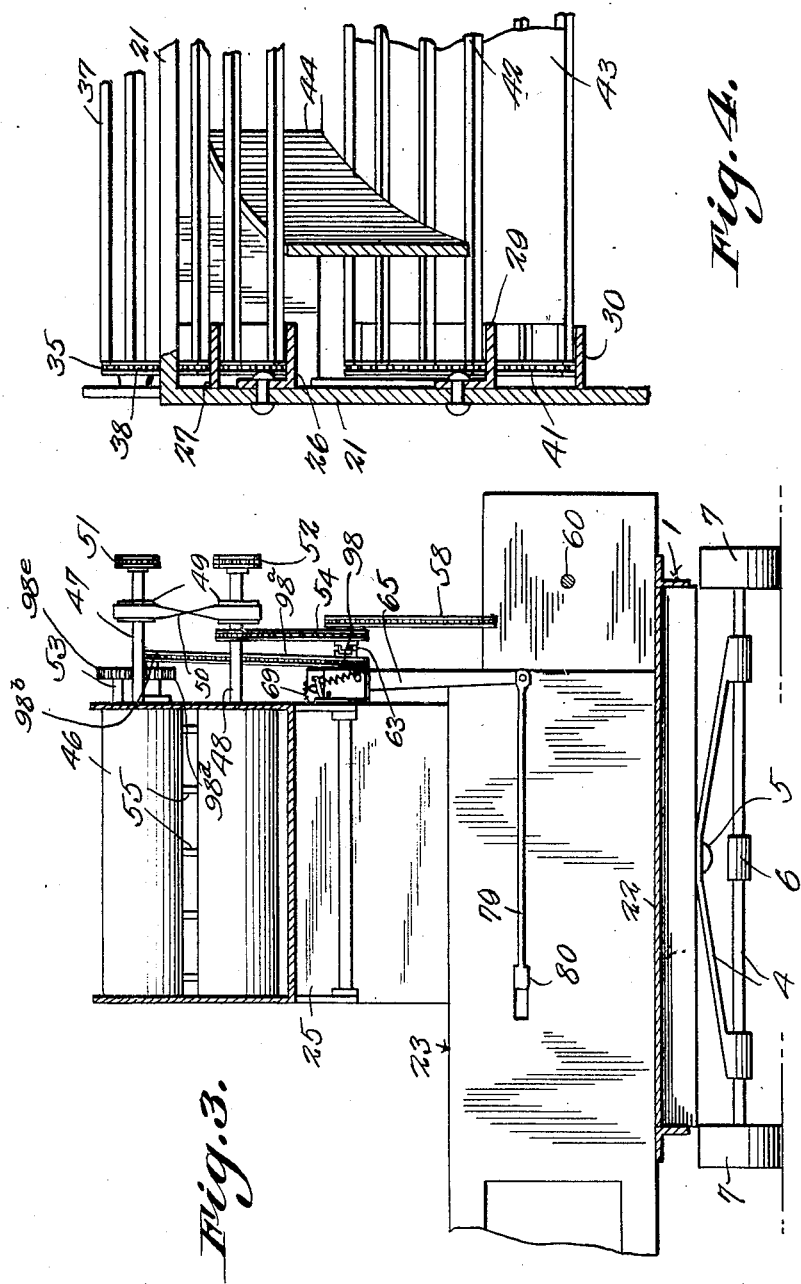
A. A. Sharples
Inventor
By C. A. Snow & Co.
Attorneys.

May 3, 1932.  A. A. SHARPLES  1,856,438
HAYMAKER
Filed Jan. 14, 1929  5 Sheets-Sheet 4

A. A. Sharples
Inventor
By C. A. Snow & Co.
Attorneys.

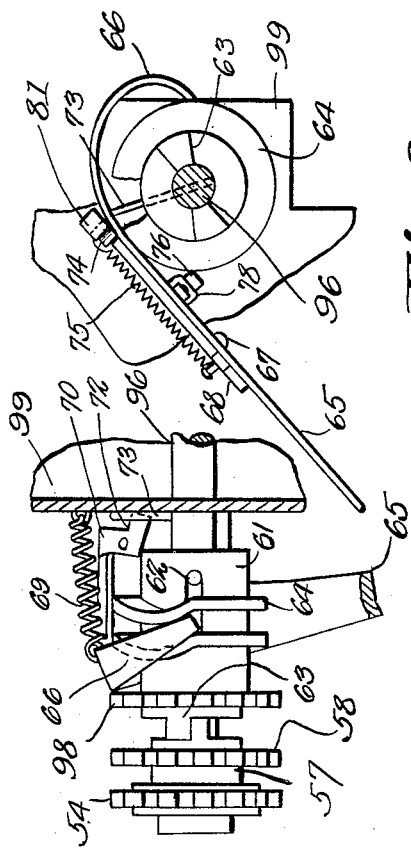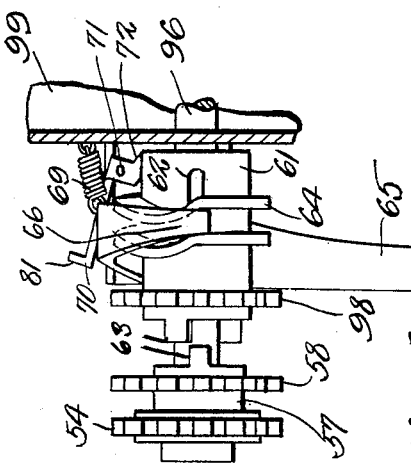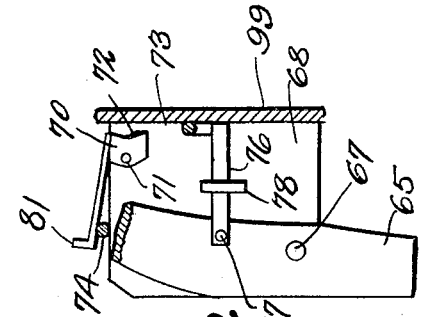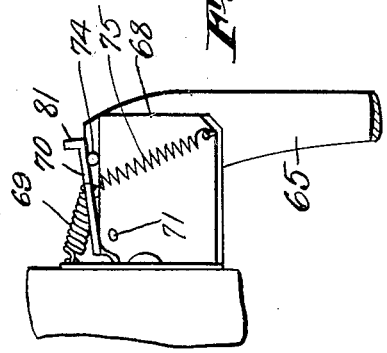

Patented May 3, 1932

1,856,438

UNITED STATES PATENT OFFICE

ARTHUR A. SHARPLES, OF STOCKDALE, KANSAS

HAYMAKER

Application filed January 14, 1929. Serial No. 332,487.

This invention has as one of its objects, the provision of novel means whereby hay may be raked and then conveyed to a feeder which discharges into a baling press. Another object of the invention is to prov.de novel means whereby the hay will be delivered into the feeder at a proper step in the operation of the press. A further object of the invention is to provide a novel mechanism whereby the hay is raked.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 2 is a side elevat:on;

Figure 3 is a transverse section taken at a point adjacent to the feeder;

Figure 4 is a fragmental transverse section taken approximately on the line 4—4 of Figure 1;

Figure 6 is a plan showing one of the clutch mechanisms thrown out;

Figure 7 is a view similar to Figure 6, the clutch mechanism being thrown in;

Figure 8 is a transverse section showing the means whereby the clutch mechanism is operated;

Figure 9 is a detail perspect:ve view showing the mounting of the clutch lever and attendant parts;

Figure 10 is a sectional view showing the clutch lever and attendant parts.

Figure 1:
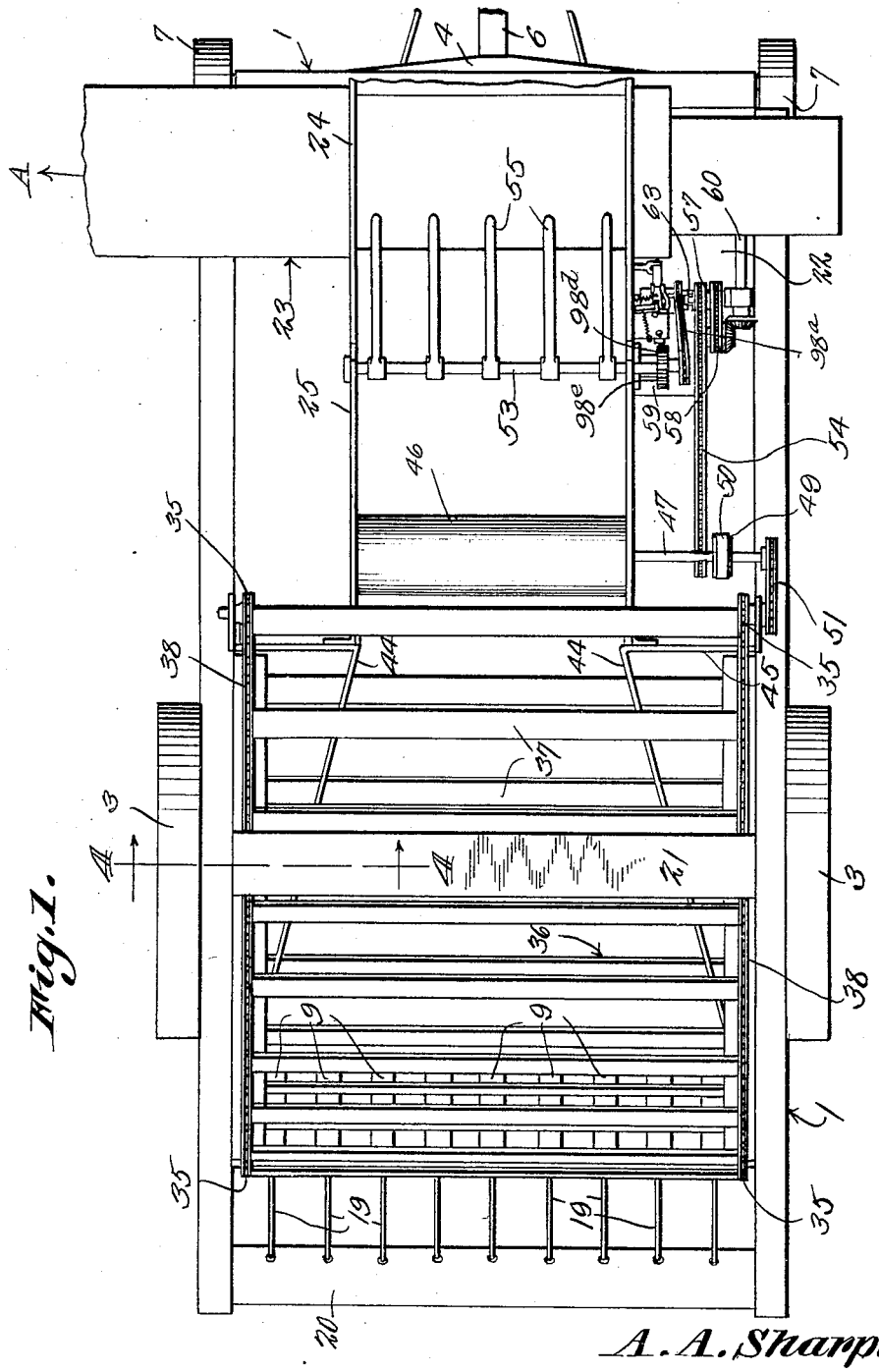
Figure 1 shows, in top plan, a device constructed in accordance with the invention, parts being broken away.

In carrying out the invention, there is provided a vehicle including a frame which is denoted generally by the numeral 1. Parts of the frame 1 which have any important function in the operation of the machine, will be alluded to specifically, as the description of the invention progresses.

On the frame 1 is mounted a rear axle 2, carrying rear ground wheels 3. The forward axle is designated by the numeral 4, and is pivotally mounted at 5 on the forward end of the vehicle frame 1, for horizontal swinging movement, in the usual way. Any suitable draft means, such as a tongue 6, is connected to the forward axle 4. Forward ground wheels 7 are journaled on the forward axle 4.

A support 8, in the form of a rod, extends transversely of the vehicle, and passes through inclined lifting blocks 11 on the forward ends of rake tines 9, the points of the rake tines being designated by the numeral 12. The support or rod 8 can turn in the lifting blocks 11. The rear ends 10 of the rake tines 9 are upwardly curved, as shown clearly in Figure 5 of the drawings.

Suspension rods 14 are connected to the ends of the support 8, and slide in guides 15 mounted on the sides of the frame 1. Segments 16 are secured to the frame 1. Levers 17 are fulcrumed on the segments 16 and are pivotally connected, at their rear ends, with the upper ends of the suspension rods 14. The levers 17 are supplied with latches 18 adapted to cooperate with the segments 16. The forward ends of rigid links 19 are pivotally connected with the rake tines 9, the rear ends of the links being pivotally connected to a cross bar 20 which forms part of the frame 1 of the vehicle.

The opposite side portions of the frame 1 are connected by an arched standard 21. On the forward part of the frame 1 a platform 22 is mounted. The platform 22 supports a baling press 23, which may be of any desired construction. As disclosed, but not necessarily, the baling press 23 includes a hopper 24. The bales of hay may be discharged at the side of the vehicle, in the direction of the arrow A in Figure 1. The device includes a horizontal feeder 25, discharging into the hopper 24 of the press 23.

Figure 5:
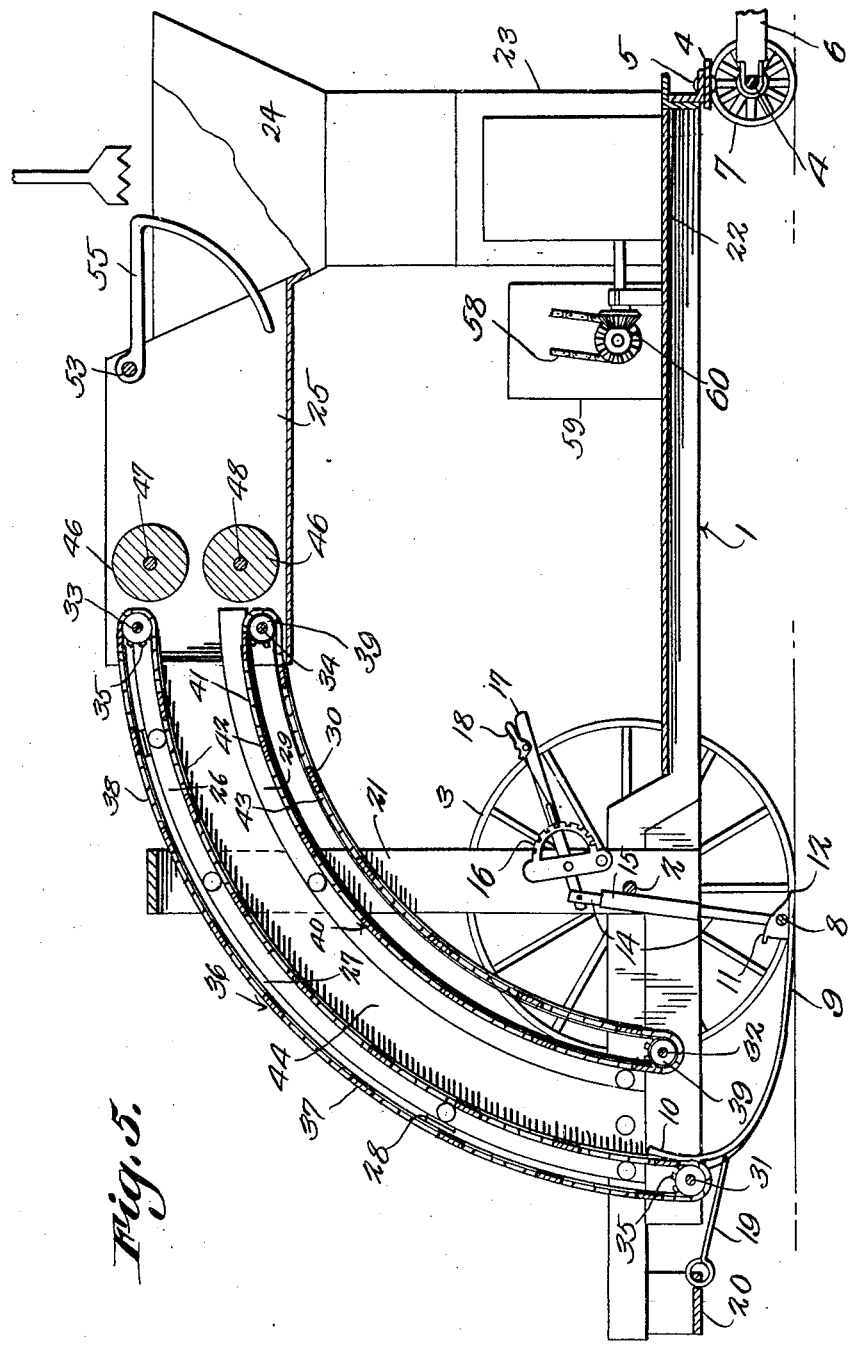
Figure 5 is a longitudinal section of the complete machine.

Referring to Figure 5, in connection with Figure 4, it will be observed that a curved first track 26 is provided. The track 26 may be an angle member, connected to the feeder 25, to the standard 21, and to the rear part of the frame 1. Disposed above the first track 26, in parallel relation thereto, is a curved second track 27 which is connected to the first track 26 by brackets 28. A third track 29, which may be an angle member, is disposed parallel to the tracks 26 and 27, and is secured to the feeder 25, the standard 21 and the rear part of the frame 1. A fourth track 30 is disposed parallel to the third track 29 and is mounted on the feeder 25, on the standard 21, and on the rear part of the frame 1. The tracks 30, 29, 26, and 27, shown in section in Figure 4 at one side of the machine, are duplicated at the opposite side of the machine.

A first shaft 31 is journaled in the frame 1 at the rear end thereof, as shown in Figure 5. A second shaft 32 is journaled in the rear part of the frame 1 and is located slightly in advance of the shaft 31. A third shaft 33 is journaled in the upper part of the feeder 25. A fourth shaft 34 is journaled in the feeder 25 and is located below the shaft 33.

Sprocket wheels 35 are mounted on the shafts 31 and 33. A top conveyor 36 is provided, and includes slats 37 connected by chains 38. The chains 38 engage the sprocket wheels 35 on the shafts 31 and 33. The upper runs of the chains 38 move along the second track 27, and the lower runs of the said chains move along the track 26.

Sprocket wheels 39 are mounted on the shafts 32 and 34. A bottom conveyor 40 is provided, and includes chains 41 connected by slats 42, the slats carrying a flexible body 43 preferably made of canvas. The chains 41 are engaged with the sprocket wheels 39. The upper runs of the chains 41 move along the tracks 29, and the lower runs of the said chains move along the tracks 30. The upwardly curved rear ends 10 of the rake tines 9 cooperate with the lower rear end of the top conveyor 36, as disclosed in Figure 5 of the drawings.

In the space between the lower run of the top conveyor 36 and the upper run of the bottom conveyor 40 are located guides 44. At their rear lower ends, the guides 44 are connected to the sides of the frame 1. At their upper ends, the guides 44 are supplied with outwardly extended arms 45 (Figure 1) which are connected to any accessible part of the machine, for instance, to the feeder 25. The guides 44 converge as they extend upwardly and forwardly. Compression and feed rolls 46 are located in the feeder 25, one above the other, the upper-most roll being located in advance of the shaft 33, and the lower-most roll being located in advance of the shaft 34. The rolls 46 are carried, respectively, by an upper shaft 47 and a lower shaft 48, these shafts being journaled in the feeder 25. There are pulleys 49 (Figure 3) on the shafts 47 and 48, and the pulleys are connected by a crossed belt 50 indicated diagrammatically in Figure 2 of the drawings.

In Figure 2 it is shown that the shafts 47 and 33 are yoked together operatively by a chain and sprocket connection 51, and the shafts 34 and 48 are connected in a like manner as disclosed at 52. On the front portion of the feeder 25 there is journaled a horizontal shaft 53, and this shaft carries angular hay stops 55 (Figure 5) that extend backwardly into the feeder 25.

A shaft 96 is supported for rotation on a hanger 99 carried by the feeder 25. A short tubular shaft 57 (Figures 6 and 7) is journaled on one end of the shaft 96. There is a chain and sprocket connection 54 between the tubular shaft 57 and the shaft 48 (Figures 2 and 3). There is a chain and sprocket connection 58 whereby the tubular shaft 57 is driven from an engine 59 mounted on the platform 22. Through the instrumentality of any suitable mechanism, indicated at 60, the engine 59 is operatively connected with the baling press 23.

It appears from Figures 6 and 7, that a clutch sleeve 61 is mounted on the shaft 96 by means of a pin and slot connection 62, or its equivalent, the construction being such that the sleeve 61 will rotate with the sleeve 96, although the sleeve 61 can be moved lengthwise on the shaft 96. There is a sprocket wheel 98 on the sleeve 61. A sprocket chain 98a is engaged around the sprocket wheel 98. The sprocket chain 98a engages a sprocket wheel 98b. The sprocket wheel 98b is supported at 98c for rotation on the feeder 25. A gear wheel 98d turns with the sprocket wheel 98b. A gear wheel 98e meshes with the gear wheel 98d, and is secured to the shaft 53 which carries the hay stops 55. There are clutch elements 63 on the sleeve 61 and on the tubular shaft 57, the aforesaid clutch elements being moved into and out of engagement with each other when the sleeve 61 is moved longitudinally.

As to the means whereby the sleeve 61 is moved longitudinally, as and for the purpose specified, it may be stated that the sleeve 61 is provided with a circumferential cam track 64, in which is received slidably the extremity of the curved end 66 of a lever 65, the lever 65 being fulcrumed at 67 on a bracket 68 which is mounted on the hanger 99.

A link 79 (Figure 3) connects the lever 65 with a movable part 80 of the baling press, so that at a proper step in the operation of the baling press, motion will be transmitted to the lever 65, thereby to slide the sleeve 61 longitudinally and shift the clutch elements 63 of the sleeve 61 and of the tubular shaft 57 into and out of engagement with each other.

A retractile spring 69 is connected to the lever 65 and is anchored on the hanger 99 or elsewhere, the function of the spring 69 being to swing the curved end 66 of the lever 65 to the right in Figure 6, so that the tubular shaft 57 is not coupled to the shaft 96 by the clutch elements 63. The lever 65 is provided with a projection 74.

A latch 70 is fulcrumed at 71 on the bracket 68, the latch having a cam edge 72 which lies in the path of a radial finger 73 on the shaft 96, the latch 70 being held by a retractile spring 75 in such a position that the cam edge 72 is in the path of the finger 73 on the shaft 96. A stop 76 is pivoted at 77 to the lever 65 and slides in a guide 78 which is mounted on the bracket 68.

Let it be supposed that the stops 55 on the shaft 53 are extended into the feeder 25, as shown in Figures 5 and 1 of the drawings. The curved end 66 of the lever 65 has been swung to the right, as in Figure 6, and the clutch elements 63 of the sleeve 61 and of the shaft 57 are out of engagement with each other, the shaft 96 being at rest, and the shaft 57 being free to turn. The projection 74 on the lever 65 is between the latch 70 and the edge of the bracket 68, and the stop 76 is advanced so that it extends into the path of the finger 73 on the shaft 53, thereby to hold the shaft 96 against turning, the hay stops 55 on the shaft 53 being held fixed into the feeder 25, as disclosed in Figures 5 and 1.

The engine 59 operates the baling press 23 through the instrumentality of the mechanism shown at 60. The engine 59 drives the chain and sprocket connection 58, and the tubular shaft 57 is rotated on the shaft 96. The shaft 96 and the shaft 53 do not rotate, and the stops 55 remain in a fixed position in the feeder 25 because the clutch elements 63 are out of engagement.

When the sleeve 57 is rotated, the chain and sprocket connection 54 rotates the shaft 48, and from the shaft 48, rotation is imparted to the shaft 47 (Figure 2) by the crossed belt 50. Thus, the feed and compression rolls 46 of Figure 5 are rotated.

From the shaft 47, rotation is imparted to the shaft 33 by the sprocket drive 51 that is shown in Figure 2: and from the shaft 48 rotation is imparted to the shaft 34 by the sprocket drive 52. The sprocket wheels 39 on the shaft 34 actuate the bottom conveyor 40 (Figure 5) and the sprocket wheels 35 on the shaft 33 operate the top conveyor 36.

The hay is gathered by the tines 9 and is lifted by the blocks 11 over the rod 8. The hay moves backwardly and upwardly upon the rear ends 10 of the tines 9, and by the time that the hay is on the curved ends 10 of the tines 9, the hay is caught by the inner runs of the conveyors 40 and 36 and is carried upwardly and forwardly. The flexible body 43 of the bottom conveyor 40 prevents the hay from dropping through the said conveyor. The hay, as it moves upwardly and forwardly, passes between the converging guides 44 of Figure 1. The hay, thus, is compacted horizontally, or transversely of the machine, so that by the time that the hay reaches the feeder 25, the hay is in a mass that is narrow enough to pass readily into the feeder. The rolls 46 compress the hay and force it forwardly in the feeder 25, against the stops 55, the stops being called by that name because they stop the forward movement of the hay in the feeder 25.

After a sufficient quantity of hay has accumulated in the feeder 25, and at a proper step in the operation of the baling press 23, motion is imparted to the lever 65 (Figure 3) by the link 79, and the movable part 80 of the baling press. The lever 65 now is tilted on its fulcrum 67 (Figure 10) from the position of Figure 6 to the position of Figure 7. This operation brings the clutch elements 63 into engagement, so that when the tubular shaft 57 is rotated by the sprocket drive 58 from the engine 59, as hereinbefore explained, rotation will be imparted to the shaft 96 also, the sprocket drive 98 rotating the shaft 53. When the lever 65 is swung from the position of Figure 6 to the position of Figure 7, the stop 76 is pulled out of the path of the finger 73 on the shaft 96, so that the shaft 96 can rotate, as aforesaid.

When the lever 65 is tilted from the position of Figure 6 to the position of Figure 7, the projection 74 on the lever 65 moves clear of the end of the latch 70 and engages with the end 81 of the latch 70. This holds the lever 65 in the position of Figure 7, with the clutch elements 63 in engagement, rotation being imparted to the shaft 96 from the shaft 57. The shaft 53 (being coupled to the shaft 96 by the chain drive 98 and the sleeve 61) now makes a rotation, to pull out the stops 55 (Figure 5) from in front of the mass of hay in the feeder 25, so that the mass of hay in the feeder can move forwardly in the feeder and down into the hopper 24 of the baling press 23.

The shaft 96 makes a complete rotation, to restore the hay stops 55 to position of Figure 5, and in this rotation, the finger 73 on the shaft 96 wipes along the cam edge 72 of the latch 70, and the latch is tilted on its fulcrum 71, the end 81 of the latch being disengaged from the projection 74, so that the lever 65, under the action of the spring 69, and under the action of the part 80 (Figure 3) of the baling press 23, can move from the position of Figure 7 to the position of Figure 6, the clutch elements 63 being disengaged, the projection 74 on the lever 65 passing beneath the arm of the latch 70, and the stop 76 being advanced into the path of the finger 73 on the shaft 96 to hold the shaft 96 and the shaft 53 against rotation, with the hay stops 55 in the position shown in Figure 5. Because the lever 65 has been restored to the position of Figure 6, the shaft 57 can turn, to operate the conveyors 40 and 36, without rotating the shaft 96 and the shaft 53. This is so, because the clutch elements 63 of the shaft 57 and of the sleeve 61 are disengaged.

When the lever 65 is tilted, the cam track 64 on the sleeve 61, cooperating with the extremity of the lever 65, aids in imparting longitudinal movement to the sleeve 61, as the sleeve rotates with the shaft 53.

Referring to Figure 5, it will be understood that the forward ends 12 of the rake tines 9 can be raised and lowered at the will of the operator, through the instrumentality of the levers 17, the suspension rods 14 and the rod 8, the rake tines being held by the latch mechanism 18 and the segments 16 in any position to which they may have been adjusted. It is to be observed that the front ends 12 of the rake tines 9 are directly below the shaft 12, which represents the axis of rotation of the wheels 3. The result is that the rake tines 9 always make a clean pick-up, because the front ends 12 of the tines are so located that when the lower-most parts of the ground wheels 3 go down into a depression, the ends 12 of the rake tines go down into the depression also and the hay is not passed over and missed. The links 19 of Figure 5 are rigid and take some of the backward thrust from the tines 9. This is desirable because the strain is divided fairly between the support or rod 8 and the links 19.

The machine hereinbefore described straddles a windrow of hay, gathers it up, and bales it on the go.

What is claimed is:—

1. In a device of the class described, a vehicle, a feeder thereon, a movably mounted stop in the feeder, a conveyor on the vehicle and extended upwardly and forwardly to the feeder, a rake on the vehicle and extended upwardly and rearwardly to the lower rear end of the conveyor, a driving device for the conveyor, an engine on the vehicle and operatively connected to the driving device, clutch mechanism for coupling the stop to the driving device, and means for operating the clutch mechanism automatically at intervals from the driving device, through power derived from the engine and independently of an operator to withdraw the stop from the feeder and then return the stop into the feeder.

2. In a device of the class described, a vehicle, a feeder thereon, a movably mounted stop in the feeder, spaced conveyors on the vehicle and extended upwardly and forwardly to the feeder, guides supported between the conveyors and converging in the direction of advance of the conveyors, the guides constituting means for compacting the material for delivery into the feeder as the material is advanced by the conveyors, a rake on the vehicle and delivering the material between the conveyors, and automatically acting means for moving the stop out of the feeder at intervals.

3. In a device of the class described, a vehicle, ground wheels mounted to rotate on the vehicle on a horizontal axis, a conveyor on the vehicle, and extended upwardly and forwardly, means for receiving material from the upper forward end of the conveyor, a rake on the vehicle and extended upwardly and rearwardly to the lower rear end of the conveyor, the forward end of the rake being located in the same vertical plane with the horizontal axis on which the ground wheels are mounted to rotate, and means for raising and lowering the forward end of the rake at the will of an operator.

4. In a device of the class described, a vehicle, ground wheels mounted to rotate on the vehicle on a horizontal axis, spaced conveyors on the vehicle and extended upwardly and forwardly, means for receiving material from the upper forward ends of the conveyors, guides supported between the conveyors and converging in the direction of advance of the conveyors, the guides constituting mechanism for compacting the material for delivery into the last specified means as the material is advanced by the conveyors, and a rake on the vehicle, the rear end of the rake being so placed as to deliver the material between the conveyors, the forward end of the rake being located in the same vertical plane with the horizontal axis on which the ground wheels rotate.

5. In a device of the class described, a vehicle, spaced conveyors on the vehicle, the upper forward ends of the conveyors being located in a substantially horizontal position, and the lower rear ends of the conveyors being located in a substantially vertical position, a rake having an upwardly curved rear end located closely adjacent to the forward side of the lower rear end of the rearmost conveyor, means for supporting the rear portion of the rake from the vehicle, pivotally, at a point behind the lower rear end of the rearmost conveyor, and means under the control of an operator for raising and lowing the forward end of the rake.

In testimony that I claim the foregoing as my own, I have hereto affixed my signature.

ARTHUR A. SHARPLES.